US009806651B1

(12) United States Patent
Tenca et al.

(10) Patent No.: US 9,806,651 B1
(45) Date of Patent: Oct. 31, 2017

(54) DC ELECTRICAL MACHINE WITH CENTER-TAP WINDINGS SYSTEMS AND METHODS

(71) Applicant: General Electric Company, Schenectady, NY (US)

(72) Inventors: Pierluigi Tenca, Munich (DE); Konrad Roman Weeber, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/157,167

(22) Filed: May 17, 2016

(51) Int. Cl.
H02P 1/00 (2006.01)
H02P 21/00 (2016.01)
H02P 7/06 (2006.01)
H02P 25/092 (2016.01)

(52) U.S. Cl.
CPC ............ H02P 7/06 (2013.01); *H02P 25/0925* (2016.02)

(58) Field of Classification Search
CPC .. H02P 7/06; H02P 13/06; H02P 6/182; H02P 2101/30; H02P 21/18; H02P 25/0925; H02P 6/085; H02P 9/38; H02P 9/40
USPC .................... 318/493, 400.35, 701
See application file for complete search history.

(56) References Cited

U.S. PATENT DOCUMENTS

| 3,678,352 | A | * | 7/1972 | Bedford | .............. | H02P 25/0925 318/400.2 |
| 3,749,991 | A | | 7/1973 | Kuniyoshi | | |
| 4,035,699 | A | | 7/1977 | Schade | | |
| 4,746,844 | A | | 5/1988 | MacKelvie et al. | | |
| 5,055,751 | A | | 10/1991 | MacKelvie | | |
| 6,140,729 | A | | 10/2000 | Pollock et al. | | |
| 6,359,401 | B1 | | 3/2002 | Garcia-Sinclair et al. | | |

(Continued)

FOREIGN PATENT DOCUMENTS

WO 2007054909 A2 5/2007
WO 2012062376 A1 5/2012

OTHER PUBLICATIONS

Gray, Clifford B., et al.; "GTO thyristor commutation of DC machine", Industry Applications Society Annual Meeting, 1989., Conference Record of the 1989 IEEE, vol. 1, pp. 166-170, Oct. 1-5, 1989, San Diego, CA, USA.

(Continued)

*Primary Examiner* — Bentsu Ro
*Assistant Examiner* — Zemenay Truneh
(74) *Attorney, Agent, or Firm* — Nitin N. Joshi

(57) ABSTRACT

A direct current electrical machine, which includes a rotor that generates a rotor magnetic field, a first commutation cell that includes a winding component, a first switching device, and a second switching device. The first winding component includes a first portion electrically coupled between a first terminal and a second terminal of the first winding component and a second portion electrically coupled between a third terminal and the second terminal of the first winding component. The first switching device is electrically coupled to the first terminal and is closed when a first voltage induced across the first portion by rotation of the rotor magnetic field is positive; and the second switching device is electrically coupled to the third terminal and is closed when a second voltage induced across the second portion by the rotation of the rotor magnetic field is negative.

20 Claims, 10 Drawing Sheets

(56) References Cited

U.S. PATENT DOCUMENTS

| | | |
|---|---|---|
| 6,633,145 B2 | 10/2003 | Shao et al. |
| 7,602,137 B2 | 10/2009 | Du et al. |
| 8,283,831 B1 | 10/2012 | Kaminsky et al. |
| 9,025,352 B2* | 5/2015 | Steigerwald ............ H02M 5/12 323/340 |
| 2010/0283419 A1* | 11/2010 | Foll .......................... H02P 6/24 318/400.28 |
| 2014/0175984 A1* | 6/2014 | Mieskoski ........... H05B 41/391 315/127 |

OTHER PUBLICATIONS

Lee, D.N., et al.; "Active stator, an innovative variable speed drive topology", Power Electronics, Machines and Drives (PEMD 2010), 5th IET International Conference on, pp. 1-2, Apr. 19-21, 2010, Brighton, UK.

Loddick, S.; "Active stator, a new generator topology for direct drive permanent magnet generators", AC and DC Power Transmission, 2010. ACDC. 9th IET International Conference on, pp. 1-5, Oct. 19-21, 2010, London.

\* cited by examiner

DC ELECTRICAL MACHINE WITH CENTER-TAP WINDINGS SYSTEMS AND METHODS

BACKGROUND

The present disclosure generally relates to electrical machines and, more specifically, to DC electrical machines.

Generally, an electrical machine may be used to convert between electrical energy and mechanical energy. For example, when electrical power is supplied, the electrical machine may operate in a motor mode. Specifically, the electrical power may produce a magnetic field that causes actuation of a rotor in the electrical machine, thereby converting electrical energy into mechanical energy. On the other hand, when mechanical energy is supplied, the electrical machine may operate in a generator mode. Specifically, the mechanical energy may actuate the rotor, which induces electrical power in the electrical machine, thereby converting mechanical energy into electrical energy.

As such, electrical machines may be used in various applications. In fact, the type of electrical machine utilized may be chosen based at least in part on the context in which it is used. For example, a direct current (DC) electrical machine may be used to convert DC electrical power into mechanical energy and/or to convert mechanical energy into DC electrical power. To facilitate, traditional DC electrical machines generally utilize large energy storage capacitors—particularly in high power applications. However, in some instances, utilizing large energy storage capacitors may be a limiting factor in operational reliability and/or design flexibility of a DC electrical machine.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a direct current electrical machine that operates in a motor mode, a generator mode, or both is described. The direct current electrical machine includes a rotor that generate a rotor magnetic field and a first commutation cell, which includes a first winding component, a first switching device, and a second switching device. The first winding component includes a first portion electrically coupled between a first terminal and a second terminal of the first winding component; and a second portion electrically coupled between a third terminal and the second terminal of the first winding component. The first switching device is electrically coupled to the first terminal of the first winding component and is closed when a first voltage induced across the first portion of the first winding component by rotation of the rotor magnetic field is positive. The second switching device is electrically coupled to the third terminal of the first winding component and is closed when a second voltage induced across the second portion of the first winding component by the rotation of the rotor magnetic field is negative, in which polarity of the first voltage and the second voltage are opposite.

In another embodiment, a method of operating a direct current electrical machine is described. The method includes receiving, using a controller communicatively coupled to the direct current electrical machine, first sensor data from first a sensor indicating a first voltage induced in a first center-tapped coil in a first commutation cell of the direct current electrical machine by rotation of a rotor; comparing, using the controller, the first voltage with a first voltage threshold; instructing, using the controller, a first switching unit in the first commutation cell to conduct current through a first half of the first center-tapped coil when the first voltage is greater than the first voltage threshold; instructing, using the controller, a second switching unit in the first commutation cell to conduct current through a second half of the first center-tapped coil when the first voltage is not greater than the first voltage threshold, in which the second switching unit and the second half of the first center-tapped coil are coupled in parallel with the first switching unit and the first half; instructing, using the controller, a third switching unit in a second commutation cell coupled in series with the first commutation cell to conduct current through a third half of a second center-tapped coil in the second commutation cell after instructing the first switching unit to conduct current through the first half; and instructing, using the controller, a fourth switching unit in the second commutation cell to conduct current through a fourth half of the second center-tapped coil after instructing the second switching unit to conduct current through the second half.

In another embodiment, a tangible, non-transitory, computer-readable medium configured to store instructions executable by one or more processors in a machine system is described. The instructions include instructions to determine, using the one or more processors, a first voltage induced in a first coil in a first commutation cell of an electrical machine by rotation of a rotor in the electrical machine, in which the first commutation cell does not comprise an energy storage capacitor or a resonance capacitor; instruct, using the one or more processors, a first switching device in the first commutation cell to open to block current from flowing through the first coil and to close to enable current to flow only in one direction through the first coil to a second commutation cell electrically connected to the first commutation cell in series based at least in part on the first voltage; and instruct, using the one or more processors, a second switching device in the first commutation cell to open to block current from flowing through a second coil in the first commutation cell and to close to enable current to flow only in the one direction through the second coil to the second commutation cell based at least in part on the first voltage, in which the first coil and the second coil are electromechanically coupled.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
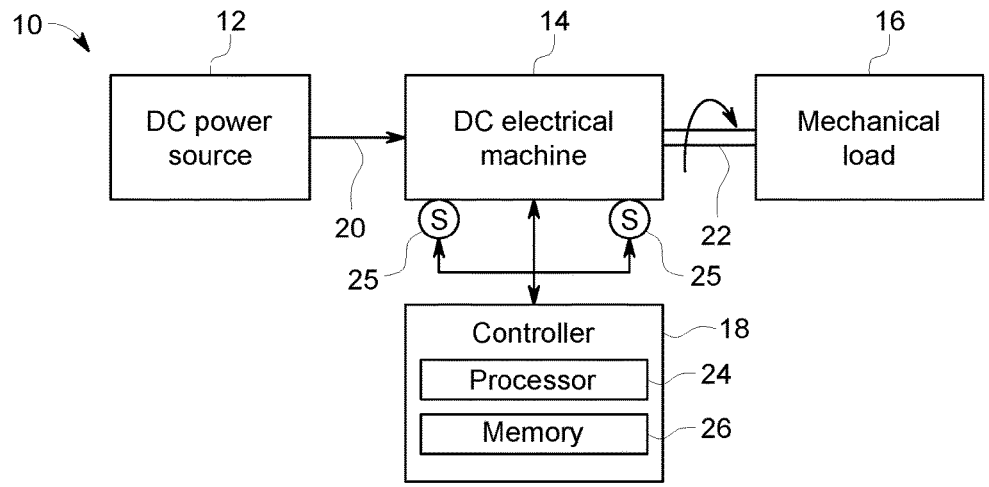
FIG. 1 is a block diagram of a machine system operating in a motor mode, in accordance with an embodiment

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Electrical machines may be utilized in a wide variety of applications. For example, in direct current (DC) applications, a DC electrical machine may be utilized. Specifically, when supplied direct current (DC) electrical power, the DC electrical machine may operate in a motor mode by converting the DC electrical power into mechanical energy. On the other hand, when supplied mechanical energy, the DC machine may operate in a generator mode by converting the mechanical energy into DC electrical power.

In DC applications, energy storage capacitors may be utilized to facilitate operation of an electrical machine. For example, when utilizing a DC electrical machine, a commutator in the DC electrical machine may include capacitors to facilitate periodically reversing current supplied to the rotor of the DC electrical machine. Additionally, when utilizing an alternating current (AC) electrical machine, a converter may include capacitors to facilitate converting input DC electrical power into AC electrical power supplied to the AC electrical machine.

In some instances, rating (e.g., energy storage capabilities) of the capacitors utilized may be dependent on magnitude of electrical power used in the DC application. For example, to provide sufficient energy storage capabilities, rating of the capacitors may increase as magnitude of electrical power utilized in the DC application increases. Accordingly, rating of the capacitors may be high when used in high DC electrical power applications, such as medium voltage direct current (MVDC) applications or high voltage direct current (HVDC) applications.

However, magnitude of undesired effects resulting from a capacitor failure may increase as energy stored in the capacitor increases. Additionally, capacitors may be more prone to failure at high temperatures, which are often present in high power applications, thereby reducing operational efficiency (e.g., percentage of time operational) of the electrical machine. Moreover, the physical size of capacitors may increase as rating increases, thereby reducing available space in the electrical machine and, thus, design flexibility. In other words, utilizing capacitors may limit operational efficiency and/or design flexibility of an electrical machine—particularly in high DC power applications.

Accordingly, the present disclosure provides techniques to improve operational efficiency and/or design flexibility by reducing or even eliminating capacitors used in a DC electrical machine. To facilitate, the DC electrical machine may utilize multiple commutation cells connected in series. In some embodiments, the multiple commutation cells may operate as the stator of the DC electrical machine.

In such embodiments, when operating in the motor mode, DC electrical power may be supplied to the DC electrical machine and flow serially through each of the commutation cells. In each of the commutation cells, DC electrical power may flow through a winding component, thereby producing a stator magnetic field, which may interact with a rotor magnetic field to actuate the rotor of the DC electrical machine. On the other hand, when operating in the generator mode, mechanical energy may be supplied to actuate the rotor. As the rotor actuates, the rotor magnetic field may induce electrical power in the winding component, which may be output from the DC electrical machine.

To facilitate, a commutation cell may include two antiparallel switching units electrically connected to its winding component. In some embodiments, each switching unit may include two or more unidirectional current carrying bidirectional voltage blocking switching devices. For example, a switching device may include a thyristor, a reverse blocking (RB) insulated-gate bipolar transistor (IGBT), a RB integrated gate-commutated thyristor (IGCT), or a serially connected diode and transistor. In this manner, the switching devices may be switched (e.g., opened and closed) to control flow of electrical power through the winding component.

In some embodiments, the winding component may be divided between a first portion and a second portion, in which rotation of the rotor magnetic field induces opposite polarity voltages. For example, the winding component may include a center-tapped coil divided into a first half and a second half by a center node. Additionally or alternatively, the winding component may include two separate coils divided by a center node. In such embodiments, a first switching unit may be electrically coupled between a first terminal of the commutation cell and the first portion of the winding, a second switching unit may be electrically coupled between the first terminal of the commutation cell and the second portion of the winding, and the center node may be electrically coupled to a second terminal of the commutation cell.

In operation, two switching devices in a commutation cell may be opened and closed relatively complimentary to one another. In some embodiments, the switching devices may be opened and closed based at least in part on voltage induced across in its corresponding portion of the winding component. For example, when operating in the motor mode, a first switching device in the first switching unit may be closed when voltage across the first portion of the winding component is positive and a second switching device in the second switching unit may be closed when voltage across the second portion of the winding component is negative. In this manner, since voltage induced across the first portion and the second portion may be opposite polarities, positive instantaneous power may be supplied to the winding component and the magnetic field generated may periodically be reversed to facilitate actuation of the rotor.

On the other hand, when operating in the generator mode, the first switching device in the first switching unit may be closed when voltage across the first portion of the winding component is negative and the second switching device in the second switching unit may be closed when voltage across the second portion of the winding component is positive. Since voltage induced across the first portion and the second portion may be opposite polarities, negative instantaneous power may be supplied to the winding component. In other words, positive instantaneous power may be supplied from the winding component, thereby generating DC electrical power, which may be output from the DC electrical machine.

By operating in this manner, the commutation cells may enable the DC electrical machine to operate in the motor mode and/or the generator mode with reduced or even eliminated use of energy storage capacitors. As such, operational efficiency and/or design flexibility of the DC electrical machine may be improved. Moreover, in some embodiments, the techniques may be particularly useful in high electrical power (e.g., HVDC or MVDC) applications and/or high speed applications since the armature windings (e.g., winding component described below) are included on the stator instead of the rotor, thereby simplifying construction and/or obviating use of a mechanical (e.g., brushed) commutator, which may otherwise limit operation of a DC electrical machine in such applications.

To help illustrate, one embodiment of a machine system 10 operating in a motor mode is described in FIG. 1. In the depicted embodiment, the machine system 10 includes a DC power source 12, a DC electrical machine 14, a mechanical load 16, and a controller 18. Specifically, the DC power source 12 may be electrically connected to the DC electrical machine 14 via an electrical connection 20 to enable the DC power source 12 to supply DC electrical power to the DC electrical machine 14. Accordingly, in some embodiments, the DC power source 12 may be a DC power generator and/or a DC power storage component, such as a battery. In other embodiments, the DC power source 12 may convert AC electrical power into the DC electrical power supplied to the DC electrical machine 14.

Additionally, in some embodiments, the DC power source 12 may supply high voltage direct current (HVDC) electrical power and/or medium voltage direct current (MVDC) electrical power to the DC electrical machine 14. In other words, in some embodiments, the DC electrical machine 14 may operate using high voltage electrical power and, thus, be a high voltage electrical machine.

Furthermore, the DC electrical machine 14 may be mechanically coupled to the mechanical load 16 by a mechanical connection 22 to enable the DC electrical machine 14 to supply mechanical energy to the mechanical load 16. For example, the mechanical connection 22 may be a drive shaft that enables the DC electrical machine 14 to actuate the mechanical load 16. Accordingly, in some embodiments, the mechanical load 16 may be a wheel, a turbine, an electrical generator, or the like. Additionally, in some embodiments, the DC electrical machine 14 may actual the mechanical connection 22 at high speeds and, thus, be a high speed electrical machine.

As described above, in the motor mode, the DC electrical machine 14 may operate to convert the DC electrical power received from the DC power source 12 into mechanical energy supplied to the mechanical load 16. To facilitate, the controller 18 may control operation of the DC electrical machine 14, for example, by instructing switching devices to open or close. Accordingly, the controller 18 may include a processor component 24 and a memory component 26. In some embodiments, the memory component 26 may include a tangible, non-transitory, computer readable medium that stores instruction executable by the processor component 24. Thus, in such embodiments, the memory component 26 may include random access memory (RAM), read only memory (ROM), rewritable non-volatile memory (e.g., flash memory), hard drives, optical discs, and the like. Additionally, the processor component 24 may include one or more general purpose microprocessors, one or more application specific processors (ASICs), one or more field programmable logic arrays (FPGAs), or any combination thereof.

As will be described in more detail below, in some embodiments, the controller 18 may control operation based at least in part on operational parameters of the DC electrical machine 14. To facilitate, one or more sensors 25 may be disposed in or on the DC electrical machine 14 to measure the operational parameters. For example, the sensors 25 may include temperature sensors, pressure sensors, voltage sensors, current sensors, power sensors, speed sensors, torque sensors, or any combination thereof. The sensors 25 may then communicate the measured operational parameters to the controller 18 as sensor data.

Figure 2:
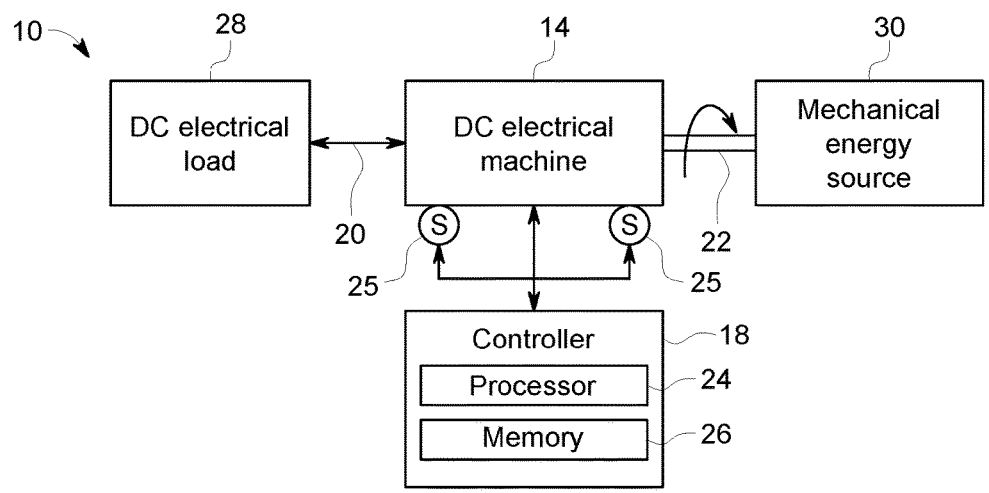
FIG. 2 is a block diagram of the machine system operating in a generator mode, in accordance with an embodiment

To further illustrate, FIG. 2 describes the machine system 10 operating in a generator mode. In the depicted embodiment, the machine system 10 includes the DC electrical machine 14, the controller 18, a DC load 28, and a mechanical energy source 30. Specifically, the mechanical energy source 30 may be mechanically coupled to the DC electrical machine 14 via the mechanical connection 22 to enable the mechanical energy source 30 to supply mechanical energy to the DC electrical machine 14. Accordingly, in some embodiments, the mechanical energy source 30 may include an internal combustion engine, a gas turbine, a steam turbine, or the like.

Additionally, the DC electrical machine 14 may be electrically connected to the DC load 28 via the electrical connection 20 to enable DC electrical power generated by the DC electrical machine 14 to be supplied to the DC electrical load 28. Accordingly, in some embodiments, the DC electrical load 28 may include a DC energy storage component, such as a battery. Additionally, in some embodiments, the DC electrical load 28 may include an energy consumption component, such as a light bulb, a computer, or the like. Furthermore, in some embodiments, the DC electrical load 28 may include a power distribution component, such as a power grid.

As described above, in the generator mode, the DC electrical machine 14 may operate to convert the mechanical energy received from the mechanical energy source 30 into DC electrical power supplied to the DC electrical load 28. Similar to the motor mode, the controller 18 may control operation of the DC electrical machine 14 to facilitate the conversion. For example, as described above, the controller 18 may instruct switching devices in the DC electrical machine 14 to open or close at specific times to facilitate converting between mechanical energy and electrical energy.

Figure 3:
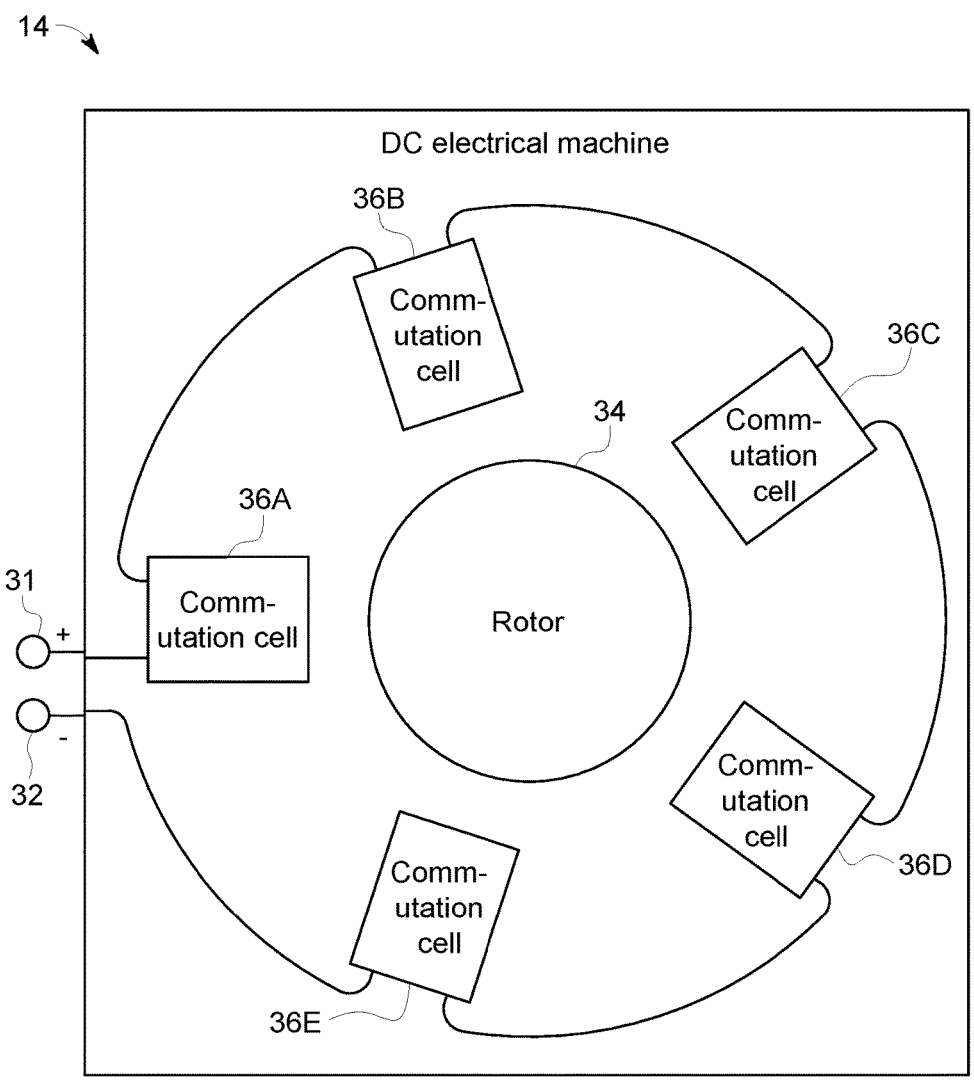
FIG. 3 is a block diagram of a direct current (DC) electrical machine that may be used in the machine system, in accordance with an embodiment.

To help illustrate, one embodiment of the DC electrical machine 14 (e.g., a high voltage and/or high speed electrical machine) is described in FIG. 3. In the depicted embodiment, the DC electrical machine 14 includes a first terminal 31, a second terminal 32, a rotor 34, and a stator including multiple commutation cells 36 connected in series. In the depicted embodiment, the DC electrical machine 14 includes five commutation cells 36—namely a first commutation cell 36A, a second commutation cell 36B, a third commutation cell 36C, a fourth commutation cell 36D, and a fifth commutation cell 36E. It should be noted that this is merely intended to be illustrative. In other words, other embodiments may include any number of commutation cells 36 electrically connected in series. Additionally, it should be noted that, although in the depicted embodiment the commutation cells 36 are implemented on the stator, in other embodiments the commutation cells 36 may instead be implemented on the rotor 34.

With regard to the depicted embodiment, the rotor 34 may be mechanically coupled to the mechanical connection 22, thereby enabling the DC electrical machine 14 to supply mechanical energy to the mechanical load 16 and/or to receive mechanical energy from the mechanical energy source 30. Additionally, the rotor 34 may generate a rotor magnetic field. To facilitate, in some embodiments, the rotor 34 may include a permanent magnet and/or a field wound electromagnet. Additionally, the first terminal 31 and the second terminal 32 may be electrically connected to the electrical connection 20, thereby enabling the DC electrical machine 14 to receive DC electrical power form the DC power source 12 and/or to supply DC electrical power to the DC electrical load 28.

Accordingly, when operating in the motor mode, DC electrical power supplied to the first terminal 31 may flow serially through the first commutation cell 36A, the second commutation cell 36B, the third commutation cell 36C, the fourth commutation cell 36D, and the fifth commutation cell 36E. As DC electrical power flows through the commutation cells 36, the commutation cells 36 may facilitate generating a time varying stator magnetic field, which interacts with the rotor magnetic field to actuate the rotor 34. As will be described in more detail below, switching (e.g., opening and closing) of switching devices in the commutation cells 36 may be controlled to generate the time-varying stator magnetic field.

On the other hand, when operating in the generator mode, actuation of the rotor 34 may cause the rotor magnetic field to rotate, thereby inducing electrical power in the commutation cells 36. For example, with regard to the depicted embodiment, generated (e.g., induced) DC electrical power may flow serially through the first commutation cell 36A, the second commutation cell 36B, the third commutation cell 36C, the fourth commutation cell 36D, and the fifth commutation cell 36E and out the second terminal 32. As will be described in more detail below, switching (e.g., opening and closing) of switching devices in the commutation cells 36 may be controlled to generate the DC electrical power.

Figure 4:
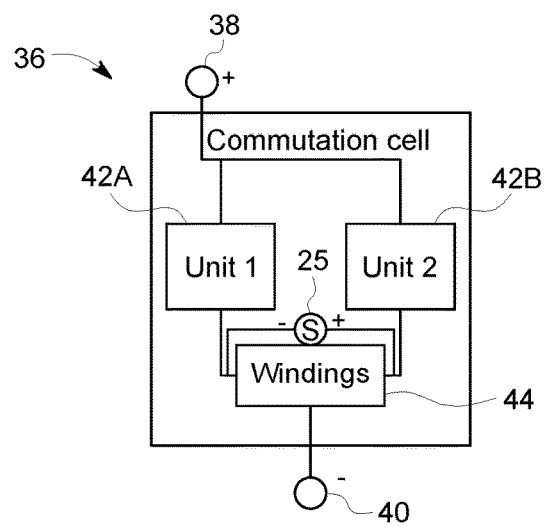
FIG. 4 is a block diagram of one embodiment of a commutation cell that may be used in the electrical machine of FIG. 3, in accordance with an embodiment.

To help illustrate, one embodiment of a commutation cell 36 is described in FIG. 4. In the depicted embodiment, the commutation cell 36 includes a first terminal 38, a second terminal 40, a first switching unit 42A, a second switching unit 42B, and a winding component 44. In some embodiments, the first terminal 38 and the second terminal 40 may enable electrically connecting the commutation cell 36 in series with the first terminal 31 of the DC electrical machine 14, the second terminal 32 of the DC electrical machine 14, and other commutation cells 36. For example, the first terminal 38 of the first commutation cell 36A may be electrically connected to the first terminal 31 of the DC electrical machine 14 and the second terminal 40 of the first commutation cell 36A may be electrically connected to the first terminal 38 of the second commutation cell 36B. Similarly, the first terminal 38 of the fifth commutation cell 36E may be electrically connected to the second terminal 40 of the fourth commutation cell 36D and the second terminal 40 of the fifth commutation cell 36E may be electrically connected to the second terminal 32 of the DC electrical machine 14.

Additionally, as depicted, the first switching unit 42A and the second switching unit 42B are electrically connected in antiparallel between the first terminal 38 of the commutation cell 36 and the winding component 44. As described above, the switching units 42 may each include one or more switching devices, which may be switched (e.g., opened or closed) to control flow of current through the winding component 44.

Figure 5:
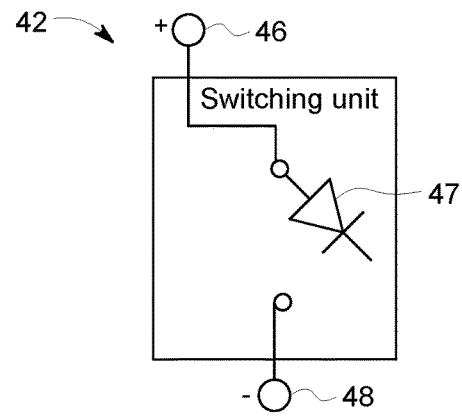
FIG. 5 is a block diagram of one embodiment of a switching unit that may be used in the commutation cell of FIG. 4, in accordance with embodiment.

To help illustrate, one embodiment of a switching unit 42 is described in FIG. 5. In the depicted embodiment, the switching unit 42 includes a first terminal 46, a switching device 47, and a second terminal 48. In some embodiments, the switching device 47 may be a unidirectional current carrying bidirectional voltage blocking switching device. For example, the switching device 47 may include a thyristor, a reverse blocking insulated-gate bipolar transistor (RB-IGBT), a RB integrated gate-commutated thyristor (RB-IGCT), a serially connected diode and transistor (e.g., an insulated-gate bipolar transistor (IGBT), an integrated gate-commutated thyristor (IGCT), or a metal-oxide field effect transistor (MOSFET)), or any combination thereof. Additionally, in some embodiments, the switching device 47 may include a wide band-gap transistor, such as a silicon carbide (SiC) transistor or a gallium nitride (GaN) transistor, for example, when the DC electrical machine 14 operates using high voltage electrical power (HVDC) and/or actuates the mechanical connect 22 at high speeds.

Additionally, as depicted, the switching device 47 is electrically coupled between the first terminal 46 and the second terminal 48 of the switching unit 42. Thus, when open, the switching unit 42 may disconnect the first terminal 46 and the second terminal 48, thereby blocking voltage and current. On the other hand, when closed, the switching unit 42 may connect the first terminal 46 and the second terminal 48, thereby enabling current to flow from the first terminal 46 to the second terminal 48.

Returning to FIG. 4, the first switching unit 42A and the second switching unit 42B may both use the same configuration. For example, the first terminal 46 of the first switching unit 42A and the first terminal of the second switching unit 42B may be electrically coupled to the first terminal 38 of the commutation cell 36. Additionally, the second terminal 48 of the first switching unit 42A and the second terminal 48 of the second switching unit 42B may be electrically coupled to the winding component 44. In this manner, operation of the first switching unit 42A and the second switching unit 42B may be controlled to control flow of current through the winding component 44.

For example, using the configuration described in FIG. 5, current may flow from the first terminal 38 of the commutation cell 36 to the winding component 44 via the first switching unit 42A when the switching device 47 in the first switching unit 42A is closed. Similarly, current may flow from the first terminal 38 of the commutation cell 36 to the winding component 44 via the second switching unit 42B when the switching device 47 in the second switching unit 42B is closed. In this manner, by controlling flow of current through the winding component 44, the commutation cell 36 may facilitate actuating the rotor 34 in a first direction and generating DC electrical power when the rotor 34 is actuated in a second (e.g., opposite) direction.

Figure 6A:
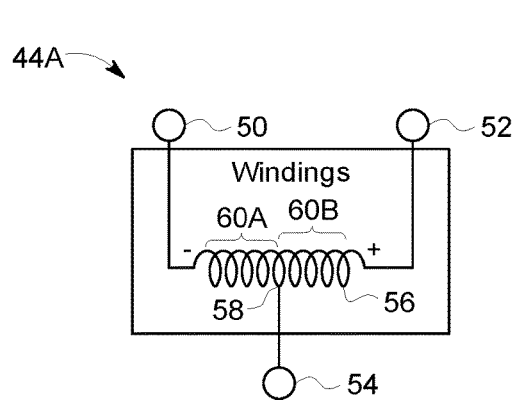
FIG. 6A is a block diagram of one embodiment of a winding component that may be used in the commutation cell of FIG. 4, in accordance with an embodiment.
Figure 6B:
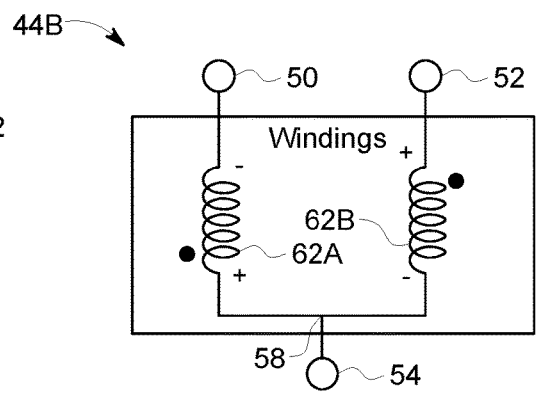
FIG. 6B is block diagram of another embodiment of a winding component that may be used in the commutation cell of FIG. 4, in accordance with an embodiment.

To help illustrate, a first embodiment of the winding component 44A is described in FIG. 6A and a second embodiment of the winding component 44B is described in FIG. 6B. As depicted, in both embodiments, the winding component 44 includes a first terminal 50, a second terminal 52, and a third terminal 54. However, as depicted in FIG. 6A, the first embodiment of the winding component 44A includes a center-tapped coil 56. As depicted, one end of the center-tapped coil 56 is electrically connected to the first terminal 50 and the other end of the center-tapped coil 56 is electrically connected to the second terminal 52.

Additionally, as depicted, a center node 58 of the center-tapped coil 56 is electrically coupled to the third terminal 54. As described above, the center node 58 may divide the winding component 44 into a first portion and a second portion, which are electromagnetically coupled. For example, in the depicted embodiment, the center node 58 may divide the center-tapped coil 56 into a first half 60A and a second half 60B. Since both part of the center-tapped coil 56, voltage induced in the first half 60A and the second half 60B may be opposite polarities relative to the third terminal 54.

On the other hand, in the embodiment depicted in FIG. 6B, the center node 58 separates a first coil 62A and a second coil 62B in the winding component 44B. As indicated by the dots next to each coil 62, the first coil 62A and the second coil 62B may be wound (e.g., oriented) such that voltage induced in the first coil 62A and the second coil 62B may be opposite polarities relative to the third terminal 54.

As described above, rotation of the rotor 34 may cause rotation of the rotor magnetic field, which induces voltage in the winding component 44 of the commutation cells 36. For example, in the generator mode, mechanical energy may rotate the rotor 34 and, thus, the rotor magnetic field, which induces voltage in the winding component 44 to facilitate generating DC electrical power. Since the rotor 34 is also rotated during the motor mode, the rotor magnetic field may induce a back electromotive force (EMF) in the winding component 44.

Utilizing this fact, in some embodiments, the controller 18 may control operation of the first switching unit 42A and the second switching unit 42B (e.g., opening and closing of switching device 47) based at least in part on voltage induced in the first portion of the winding component 44, voltage induced in the second portion of the winding component 44, and/or the voltage induced in the winding component 44 as a whole. To facilitate, as in the depicted embodiment, a voltage sensor 25 may be connected across the winding component 44 to measure the voltage across the winding component 44 and communicate the measured voltage as sensor data to the controller 18. Additionally or alternatively, a first voltage sensor 25 may be connected across the first portion (e.g., the first half 60A or the first coil 62A) of the winding component 44 and/or a second voltage sensor 25 may be connected across the second portion (e.g., the second half 60B or the second coil 62B) of the winding component 44.

Figure 7:
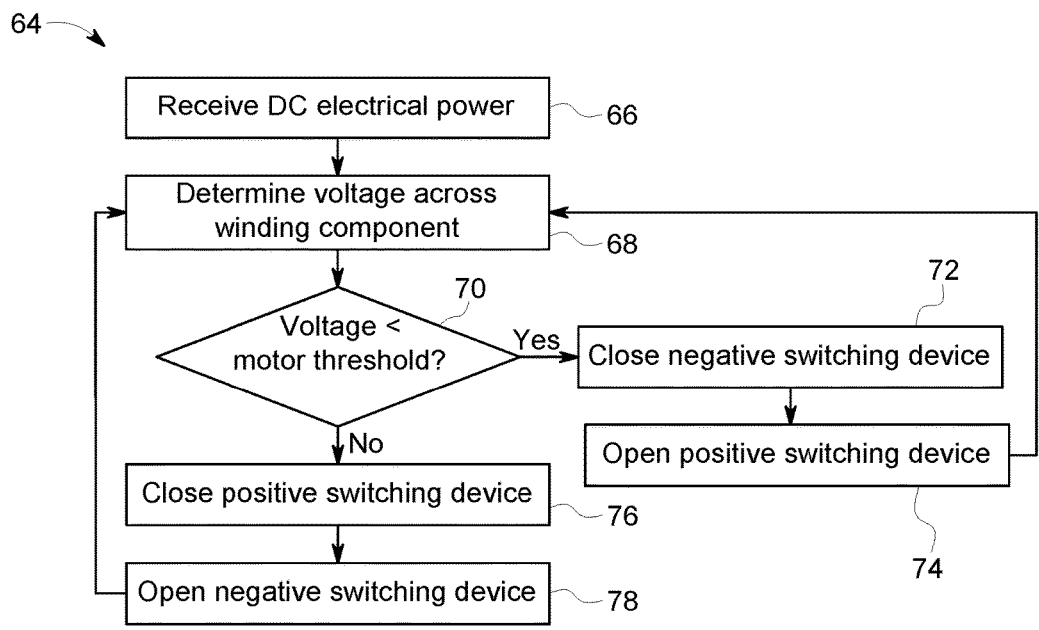
FIG. 7 is a flow diagram of a process for controlling operation of a commutation cell to facilitate operating the DC electrical machine in the motor mode, in accordance with an embodiment.

To help illustrate, one embodiment of a process 64 for controlling operation of a commutation cell 36 in the motor mode is described in FIG. 7. Generally, the process 64 includes receiving DC electrical power (process block 66), determining voltage across a winding component (process block 68), and determining whether the voltage is less than a motor voltage threshold (decision block 70). When the voltage is less than the motor voltage threshold, the process 64 includes closing a negative switching device (process block 72) and opening a positive switching device (process block 74). When the voltage is not less than the motor threshold, the process 64 includes closing the positive switching device (process block 76) and opening the negative switching device (process block 78). In some embodiments, the process 64 may be implemented by executing instructions stored in a tangible, non-transitory, computer-readable medium, such as the memory component 26, using processing circuitry, such as the processor component 24.

Accordingly, in such embodiments, the DC electrical machine 14 may receive DC electrical power (process block 66). As described above, the DC electrical machine 14 may receive DC electrical power from the DC power source 12. In the DC electrical machine 14, the DC electrical power may flow serially through multiple commutation cells 36. In each commutation cell 36, the DC electrical power may flow through the first portion (e.g., the first half 60A or the first coil 62A) of the winding component 44 via the first switching unit 42A and/or the second portion (e.g., the second half 60B or the second coil 62B) of the winding component 44 via the second switching unit 42B.

Additionally, as described above, the commutation cells 36 may generate a stator magnetic field when DC electrical power flows through the winding component 44, which interacts with a rotor magnetic field to actuate the rotor 34. As the rotor 34 actuates, the rotor magnetic field may also induce a voltage (e.g., back EMF) in the winding component 44. As described above, in some embodiments, the voltage across the winding component 44 may be used to control operation of switching devices 47 in the first switching unit 42A and the second switching unit 42B in the commutation cell 36.

Accordingly, the controller 18 may determine voltage across the winding component 44 (process block 68). In some embodiments, the controller 18 may determine the voltage across the winding component 44 based at least in part on sensor data measured by a voltage sensor 25, for example, coupled between the first terminal 50 and the second terminal 52 of the winding component 44. In other embodiments, the controller 18 may determine the voltage across the winding component 44 based at least in part on sensor data received from one or more sensors 25 in other suitable configurations, for example, a first voltage sensor 25 that measures voltage across the first portion of the winding component and a second voltage sensor 25 that measures voltage across the second portion of the winding component 44.

The controller 18 may then determine whether the winding voltage is less than a motor voltage threshold (decision block 70). In some embodiments, the motor voltage threshold may be zero volts. Additionally, in some embodiments, the motor voltage threshold may be predetermined and stored in the memory component 26. In such embodiments, the controller 18 may retrieve the motor voltage threshold from the memory component 26 and compare the voltage across the winding component 44 with the motor voltage threshold.

When the winding voltage is less than the motor voltage threshold, the controller 18 may instruct a negative switching device 47 (e.g., in the first switching unit 42A) to close (process block 72) and a positive switching device 47 (e.g., in the second switching unit 42B) to open (process block 74). In some embodiments, the controller 18 may instruct a switching device 47 to open or to close by adjusting signal supplied to the switching device 47. For example, when a switching device 47 includes a transistor, the controller 18 may instruct the switching device 47 to close by increasing a gate signal above the threshold voltage of the transistor and to open by decreasing the gate signal below the threshold voltage.

As described above, in some embodiments, the motor voltage threshold may be zero volts. In such embodiments, the voltage across the winding component 44 may be negative when less than the motor voltage threshold. In other words, voltage induced across the portion (e.g., the first portion) of the winding component 44 corresponding with the negative switching device 47 may be negative relative to the third terminal 54 of the winding component 44. Accordingly, by closing the negative switching device 47 and opening the positive switching device 47 to conduct current from the first terminal 50 to the third terminal 54 of the winding component 44, positive instantaneous power may be supplied to the winding component 44.

On the other hand, when the voltage across the winding component 44 is not less than the motor voltage threshold, the controller 18 may instruct the positive switching device 47 (e.g., in the second switching unit 42B) to close (process block 76) and the negative switching device 47 (e.g., in the first switching unit 42A) to open (process block 78). As described above, in some embodiments, the controller 18 may instruct a switching device 47 to open or to close by adjusting signal supplied to the switching device 47.

Additionally, when not less than the motor voltage threshold, the winding voltage may be a positive. In other words, voltage induced across the portion (e.g., the second portion) of the winding component 44 corresponding with the positive switching device 47 may be positive relative to the third terminal 54 of the winding component 44. Accordingly, by closing the positive switching device 47 and opening the negative switching device 47 to conduct current from the second terminal 52 to the third terminal 54 of the winding component 44, positive instantaneous power may be supplied to the winding component 44.

As described above, in some embodiments, an overlap period where both the negative switching device 47 and the positive switching device 47 are closed may be used to facilitate continuously conducting current through commutation cell 36. For example, when winding voltage is transitioning from positive to negative, the negative switching device 47 may close while the winding voltage is still positive and the positive switching device 47 may open after the winding voltage becomes negative. On the other hand, when the winding voltage is transitioning from negative to positive, the positive switching device 47 may close while the winding voltage is still negative and the negative switching device 47 may open after the winding voltage becomes positive.

In such embodiments, the controller 18 may utilize multiple motor voltage thresholds to facilitate producing the overlap period. For example, a first motor voltage threshold may be a low magnitude positive voltage and a second motor voltage threshold may be a low magnitude negative voltage. In this example, when the winding voltage is transitioning from positive to negative, the controller 18 may instruct the negative switching device 47 to close after the winding voltage becomes less than the first voltage threshold and the positive switching device 47 to open after the winding voltage becomes less than the second voltage threshold. On the other hand, when the winding voltage is transitioning from negative to positive, the controller 18 may instruct the positive switching device 47 to close after the winding voltage become greater than the second voltage threshold and the negative switching device 47 to open after the voltage becomes greater than the first voltage threshold.

To help illustrate, FIGS. 8A-8D depict plots describing operational parameters of the first commutation cell 36A when operating in the motor mode between t0 and t5. Specifically, FIG. 8A includes a first winding voltage curve 80 that indicates winding voltage in the first commutation cell 36A. Additionally, FIG. 8B includes a negative switching curve 82 that indicates a negative switching signal supplied to a negative switching device 47 (e.g., in the first switching unit 42A) and a positive switching curve 84 that indicates a positive switching signal supplied to a positive switching device 47 (e.g., in the second switching unit 42B) of the first commutation cell 36A. Furthermore, FIG. 8C includes a first current curve 86 that indicates current flowing in the first portion (e.g., the first half 60A or the first coil 62A) and a second current curve 88 that indicates current flowing in a second portion (e.g., the second half 60B or the second coil 62B) of the winding component 44. Additionally, FIG. 8D includes a first commutation cell voltage curve 90 that indicates voltage across the first commutation cell 36A.

Figure 8A:
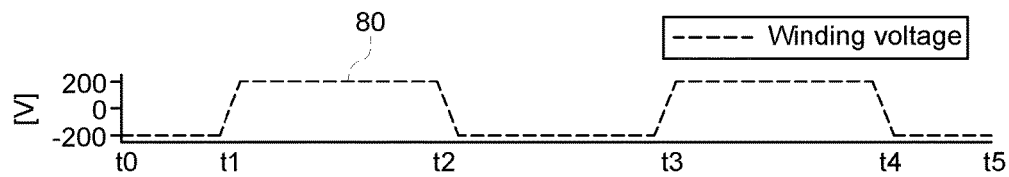
FIG. 8A is a plot of voltage across a winding component in a first commutation cell when operating in the motor mode, in accordance with an embodiment.
Figure 8B:
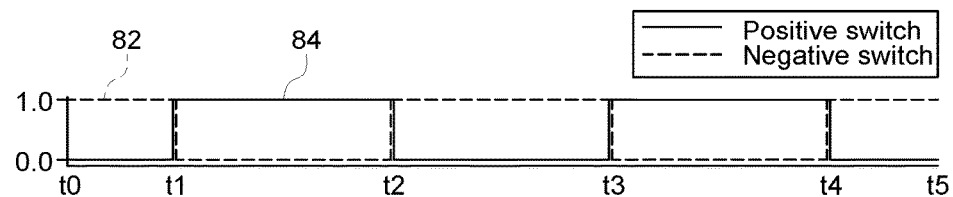
FIG. 8B is a plot of control signals used to control operation of switching units in the first commutation cell when operating in the motor mode, in accordance with an embodiment.
Figure 8C:
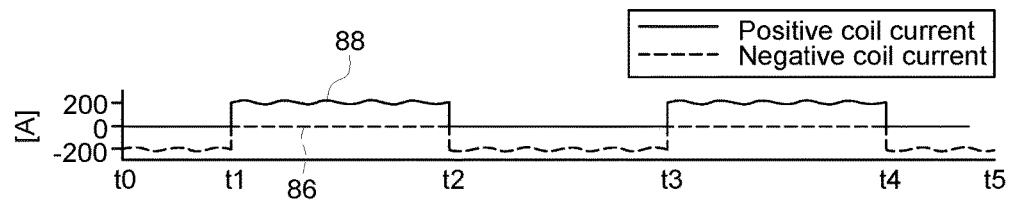
FIG. 8C is a plot of current flowing in the winding component when operating in the motor mode, in accordance with an embodiment.

As depicted in FIG. 8A, the winding voltage in the first commutation cell 36A is negative at t0, transitions from negative to positive at t1, transitions from positive to negative at t2, transitions from negative to positive at t3, transitions from positive to negative at t4, and remains negative until t5. As described above, when the winding voltage is negative (e.g., less than the motor voltage threshold), the negative switching device 47 may be closed and the positive switching device 47 may be open. Accordingly, as depicted in FIG. 8B, the negative switching signal is high, thereby closing the negative switching device 47, and the positive switching signal is low, thereby opening the positive switching device 47 between t0 to approximately t1, approximately t2 to approximately t3, and approximately t4 to t5. Thus, as depicted in FIG. 8C, current flows through first portion (e.g., the first half 60A or the first coil 62A) of the winding component 44 between t0 to approximately t1, approximately t2 to approximately t3, and approximately t4 to t5.

On the other hand, when the winding voltage is positive (e.g., not less than the motor voltage threshold), the positive switching device 47 may be closed and the negative switching device 47 may be open. Accordingly, as depicted in FIG. 8B, the positive switching signal is high, thereby closing the positive switching device 47, and the negative switching signal is low, thereby opening the negative switching device 47 between approximately t1 to approximately t2 and approximately t3 to approximately t4. Thus, as depicted in FIG. 8C, current flows through the second portion (e.g., the second half 60B or the second coil 62B) of the winding component 44 between approximately t1 to approximately t2 and approximately t3 to approximately t4.

Figure 8D:
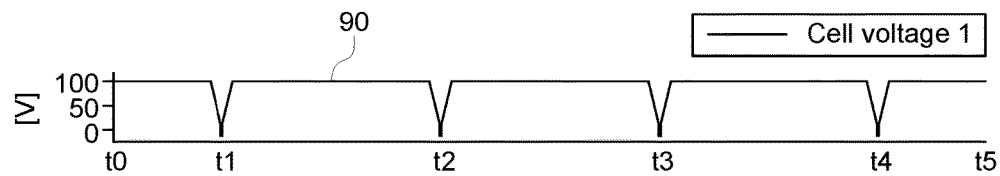
FIG. 8D is a plot of voltage across then first commutation cell when operating in the motor mode, in accordance with an embodiment.

By operating in this manner, as depicted in FIG. 8D, the voltage across the first commutation cell 36A fluctuates, but remains positive, thereby indicating that DC electrical power is being supplied to the first commutation cell 36A and used to generate the stator magnetic field, which facilitates actuating the rotor 34. As such, by controlling operation of the switching units 42 (e.g., by instructing the switching devices 47 to open or close) based at least in part on the winding voltage, the controller 18 facilitates operating the DC electrical machine 14 in the motor mode.

As described above, multiple commutation cells 36 may be coupled in series around the rotor 34 of the DC electrical machine 14. Accordingly, to operate in the motor mode, the controller 18 may control operation of each the commutation cells 36 based on voltage across its corresponding winding component 44. In some embodiments, the controller 18 may utilize a voltage sensor 25 coupled across each winding component 44.

Since disposed around the rotor 34, the multiple commutation cells 36 may be physically offset from one another. As such, back EMF induced in the winding components 44 of the commutation cells 36 and, thus, the winding voltages may be temporally offset. Accordingly, in some embodiments, the controller 18 may control operation of multiple commutation cells 36 based on winding voltage of one commutation cells to facilitate reducing number of sensors 25 and, thus, implementation costs.

Figure 9:
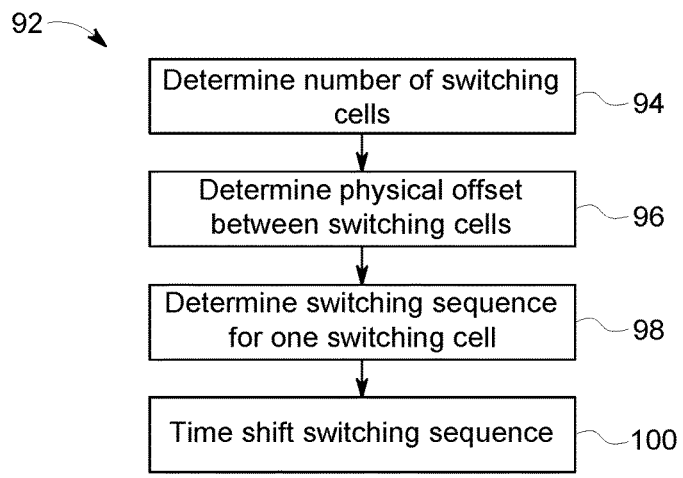
FIG. 9 is a flow diagram of a process for coordinating operation of multiple commutation cells in the DC electrical machine, in accordance with an embodiment.

To help illustrate, one embodiment of a process 92 for controlling operation of multiple commutation cells 36 is described in FIG. 9. Generally, the process 92 includes determining number of commutation cells (process block 94), determining physical offset between the commutation cells (process block 96), determining a switching sequence for one of the commutation cells (process block 98), and time shifting the switching sequence to determine switching sequences for the other commutation cells (process block 100). In some embodiments, the process 92 may be implemented by executing instructions stored in a tangible, non-transitory, computer-readable medium, such as the memory component 26, using processing circuitry, such as the processor component 24.

Accordingly, in some embodiments, the controller 18 may determine number of commutation cells 36 connected in series between the first terminal 31 and the second terminal 32 of the DC electrical machine 14 (process block 94). In some embodiments, the number of commutation cells 36 may be predetermined and stored in the memory component 26, for example, by a manufacturer of the DC electrical machine 14. Additionally, in some embodiments, the controller 18 may dynamically determine the number of commutation cells 36 using one or more sensors 25, for example, when the number may be adjustable.

Additionally, the controller 18 may determine the physical offset between the commutation cells 36 (process block 96). In some embodiments, the commutation cells 36 may be relatively evenly spaced around the rotor 34. As such, the controller 18 may determine the physical offset based on the number of commutation cells 36. For example, when five commutation cells 36 are used, the controller 18 may determine that each of the commutation cells 36 is seventy-two degrees offset from its neighboring commutation cells 36. In other words, relative to the first commutation cell 36A, the second commutation cell 36B may be seventy-two degrees offset, the third commutation cell 36C may be one hundred forty-four degrees offset, the fourth commutation cell 36D may be two hundred sixteen degrees offset, and the fifth commutation cell may be two hundred eighty-eight degrees offset.

Furthermore, the controller 18 may explicitly determine a switching sequence for one of the commutation cells 36 (process block 98). In some embodiments, the controller 18 may utilize the process 64 described above. For example, the controller 18 may determine a switching sequence (e.g., opening and closing of the switching devices 47) of the first commutation cell 36A based on voltage across its winding component 44 measured by a voltage sensor 25. As described above, in some embodiments, other commutation cells 36 may not include a voltage sensor 25 across its winding component 44. In such embodiments, the controller 18 may be unable to explicitly determine the winding voltage of the other commutation cells 36.

Accordingly, the controller 18 may time shift the explicit switching sequence based at least in part on the number of commutation cells 36 and/or the positional offset between the commutation cells 36 to determine switching sequences for the other commutation cells 36 (process block 100). For example, when the switching sequence of the first commutation cell 36A is explicitly determined and the rotor 34 is actuated at one rotation per minute, the controller 18 may determine the switching sequence for the second commutation cell 36B by time shifting the explicit switching sequence by twelve seconds, the third commutation cell 36C by time shifting the explicit switching sequence by twenty-four seconds, the fourth commutation cell 36D by time shifting the explicit switching sequence by thirty-six seconds, and the fifth commutation cell 36E by time shifting the explicit switching sequence by forty-eight seconds.

Figure 10A:
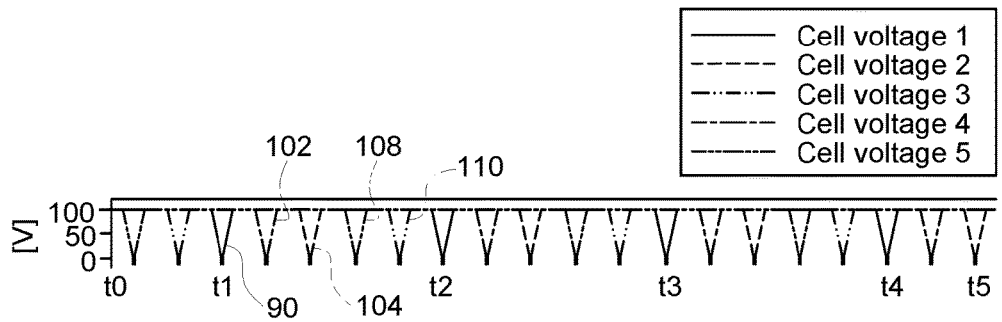
FIG. 10A is a plot of voltage across each of the multiple commutation cells in the DC electrical machine when operating in the motor mode, in accordance with an embodiment.
Figure 10B:
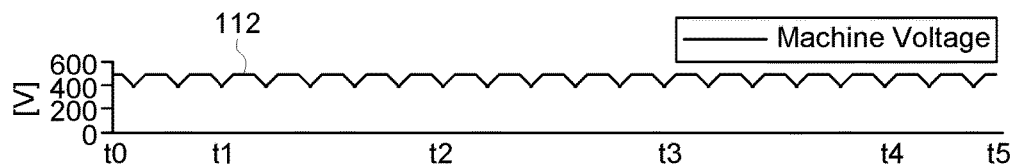
FIG. 10B is a plot of voltage across terminals of the DC electrical machine when operating in the motor mode, in accordance with an embodiment.
Figure 10C:
FIG. 10C is a plot of current flowing through the terminals of the DC electrical machine when operating in the motor mode, in accordance with an embodiment.

To help illustrate, FIGS. 10A-10C depict plots describing operational parameters of a DC machine 14 with five commutation cells 36 connected in series when operating in the motor mode between t0 and t5. Specifically, FIG. 10A includes the first commutation cell voltage curve 90 that indicates voltage across the first commutation cell 36A, a second commutation cell voltage curve 102 that indicates voltage across the second commutation cell 36B, a third commutation cell voltage curve 104 that indicates voltage across the third commutation cell 36C, a fourth commutation cell voltage curve 108 that indicates voltage across the fourth commutation cell 36D, and a fifth commutation cell voltage curve 110 that indicates voltage across the fifth commutation cell 36E. Additionally, FIG. 10B includes a machine voltage curve 112 that indicates voltage between the first terminal 31 and the second terminal 32 of the DC electrical machine 14. Furthermore, FIG. 10C includes a machine current curve 114 that indicates current flowing from the first terminal 31 to the second terminal 32 of the DC electrical machine 14.

As depicted in FIG. 10A, with respect to the voltage profile of the first commutation cell 36A, the voltage profile of the second commutation cell 36B is shifted one-fifth of the duration between t1 and t2, the voltage profile of the third commutation cell 36C is shifted two-fifths of the duration between t1 and t2, the voltage profile of the fourth commutation cell 36D is shifted three-fifths of the duration between t1 and t2, and the voltage profile of the fifth commutation cell 36E is shifted four-fifths of the duration between t1 and t2. Accordingly, in some embodiments, the controller 18 may determine the voltage profile of the other commutation cells 36 by explicitly measuring voltage profile of the first commutation cell 36A and time shifting. Additionally or alternative, the controller 18 may explicitly measure the voltage profile of each of the commutation cells 36, for example, using voltage sensors 25.

As described above, by measuring winding voltage in a commutation cell 36, the controller 18 may explicitly determine a switching sequence for the commutation cell 36. For example, when winding voltage in the first commutation cell 36A is measured, the controller 18 may explicitly determine a switching sequence for operating the first commutation cell 36A. As described above, in some embodiments, winding voltage of less than all of the commutation cells 36 may be measured. In such embodiments, the controller 18 may determine switching sequences for the other commutation cells 36 by time shifting the explicit switching sequence. For example, the controller 18 may determine a switching sequence for the second commutation cell 36B by time shifting the switching sequence for the first commutation cell 36A one-fifth of the duration between t1 and t2, the third commutation cell 36C by time shifting the switching sequence for the first commutation cell 36A two-fifths of the duration between t1 and t2, the fourth commutation cell 36D by time shifting the switching sequence for the first commutation cell 36A three-fifths of the duration between t1 and t2, and the fifth commutation cell 36E by time shifting the switching sequence for the first commutation cell 36A four-fifths of the duration between t1 and t2.

By operating in this manner, as depicted in FIG. 10B, the voltage between the first terminal 31 and the second terminal 32 of the DC electrical machine 14 is maintained positive. Additionally, as depicted in FIG. 10C, the current flowing through first terminal 31 to the second terminal 32 is maintained positive. As such, DC electrical power is supplied to the DC electrical machine 14, thereby operating the DC electrical machine 14 in the motor mode.

As described above, the DC electrical machine 14 may also be operated in the generator mode. When operating in the generator mode, mechanical energy may actuate the rotor 34 to generate (e.g., induce) electrical power in the winding components 44 of the commutation cells 36. As such, similar to the motor mode, the controller 18 may control operating of the commutation cells 36 based at least in part on voltage across their winding components 44.

Figure 11:
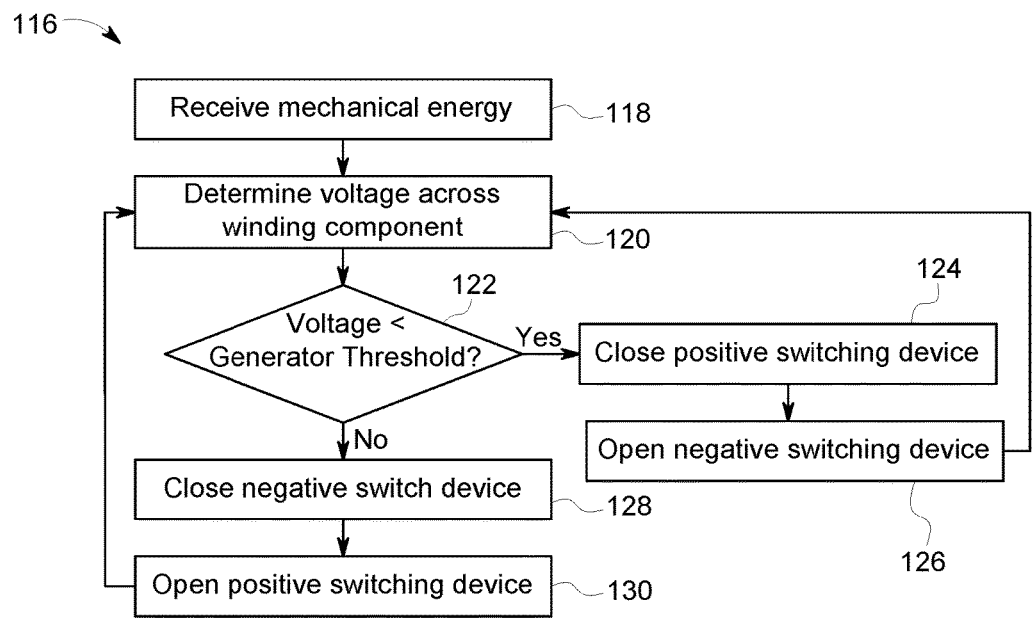
FIG. 11 is a flow diagram of a process for controlling operating of a commutation cell to facilitate operating the DC electrical machine in the generator mode, in accordance with an embodiment.

To help illustrate, one embodiment of a process 116 for controlling operation of a commutation cell 36 in the generator mode is described in FIG. 11. Generally, the process 116 includes receiving mechanical energy (process block 118), determining voltage across a winding component of a commutation cell (process block 120), and determining whether voltage across the winding component is less than a generator voltage threshold (decision block 122). When the winding voltage is less than the generator voltage threshold, the process 116 includes closing a positive switching device (process block 124) and opening a negative switching device (process block 126). When the winding voltage is not less than the generator voltage threshold, the process 116 includes closing the negative switching device (process block 128) and opening the positive switching device (process block 130). In some embodiments, the process 116 may be implemented by executing instructions stored in a tangible, non-transitory, computer-readable medium, such as the memory component 26, using processing circuitry, such as the processor component 24.

Accordingly, in such embodiments, the DC electrical machine 14 may receive mechanical energy (process block 118). As described above, the DC electrical machine 14 may receive mechanical energy from the mechanical energy source 30. In some embodiments, the mechanical energy source 30 may supply mechanical energy by actuating the rotor 34 of the DC electrical machine 14.

Additionally, as described above, the rotor 34 may produce a rotor magnetic field. Thus, when the rotor 34 is actuated, the rotor magnetic field may rotate, thereby inducing a voltage in the winding component 44 of the commutation cell 36. As described above, the voltage across the winding component 44 may be used to control operation (e.g., opening and/or closing) of switching devices 47 in the first switching unit 42A and the second switching unit 42B of the commutation cell 36.

Accordingly, the controller 18 may determine voltage across the winding component 44 (process block 120). In some embodiments, the controller 18 may determine the voltage across the winding component 44 based at least in part on sensor data measured by a voltage sensor 25, for example, coupled between the first terminal 50 and the second terminal 52 of the winding component 44. In other embodiments, the controller 18 may determine the voltage across the winding component 44 based at least in part on sensor data received from one or more sensors 25 in other suitable configurations, for example, a first voltage sensor 25 that measures voltage across the first portion of the winding component and a second voltage sensor 25 that measures voltage across the second portion of the winding component 44.

The controller 18 may then determine whether winding voltage is less than a generator voltage threshold (decision block 122). In some embodiments, the generator voltage threshold may be zero volts. However, in other embodiments, the generator voltage threshold and the motor voltage threshold may be different. Additionally, in some embodiments, the generator voltage threshold may be predetermined and stored in the memory component 26. In such embodiments, the controller 18 may retrieve the generator voltage threshold from the memory component 26 and compare the voltage across the winding component 44 with the generator voltage threshold.

When the winding voltage is less than the generator voltage threshold, the controller 18 may instruct a positive switching device 47 (e.g., in the second switching unit 42B) to close (process block 124) and a negative switching device 47 (e.g., the first switching unit 42A) to open (process block 126). In some embodiments, the controller 18 may instruct a switching unit 42 to open or to close by adjusting signal supplied to the switching unit 42. For example, when a switching unit 42 includes a transistor, the controller 18 may instruct the switching unit 42 to close by increasing a gate signal above the threshold voltage of the transistor and to open by decreasing the gate signal below the threshold voltage.

As described above, in some embodiments, the generator voltage threshold may be zero volts. In such embodiments, the voltage across the winding component 44 may be negative when less than the generator voltage threshold. In other words, voltage induced across the portion (e.g., the second portion) of the winding component 44 corresponding with the positive switching device 47 may be positive relative to the third terminal 54 of the winding component 44. Accordingly, by closing the positive switching device 47 and opening the negative switching device 47 to conduct current from the first terminal 50 to the third terminal 54 of the winding component 44, negative instantaneous power may be supplied to the winding component 44. In other words, positive instantaneous power may be supplied from the winding component.

On the other hand, when the voltage across the winding component 44 is not less than the generator voltage threshold, the controller 18 may instruct the negative switching device 47 (e.g., in the first switching unit 42A) to close (process block 126) and the positive switching device 47 (e.g., the second switching unit 42B) to open (process block 130). As described above, in some embodiments, the controller 18 may instruct a switching unit 42 to open or to close by adjusting signal supplied to the switching unit 42.

Additionally, when not less than the generator voltage threshold, the winding voltage may be a positive. In other words, voltage induced across the portion (e.g., the first portion) of the winding component 44 corresponding with the negative switching device 47 may be positive relative to the third terminal 54 of the winding component 44. Accordingly, by closing the negative switching device 47 and opening the positive switching device 47 to conduct current from the first terminal 50 to the third terminal 54 of the winding component 44, negative instantaneous power may be supplied to the winding component 44. In other words, positive instantaneous power may be supplied from the winding component 44.

As described above, in some embodiments, an overlap period where both the negative switching device 47 and the positive switching device 47 are closed may be used to facilitate continuously conducting current through commutation cell 36. For example, when winding voltage is transitioning from positive to negative, the positive switching device 47 may close while the winding voltage is still positive and the negative switching device 47 may open after the winding voltage becomes negative. On the other hand, when the winding voltage is transitioning from negative to positive, the negative switching device 47 may close while the winding voltage is still negative and the positive switching device 47 may open after the winding voltage becomes positive.

In such embodiments, the controller 18 may utilize multiple generator voltage thresholds to facilitate producing the overlap period. For example, a first generator voltage threshold may be a low magnitude positive voltage and a second generator voltage threshold may be a low magnitude negative voltage. In this example, when the winding voltage is transitioning from positive to negative, the controller 18 may instruct the positive switching device 47 to close after the winding voltage becomes less than the first voltage threshold and the negative switching unit to open after the voltage becomes less than the second voltage threshold. On the other hand, when the winding voltage is transitioning from negative to positive, the controller 18 may instruct the negative switching device 47 to close after the winding voltage become greater the second generator voltage threshold and the positive switching device 47 to open after the voltage becomes greater than the first generator voltage threshold.

To help illustrate, FIGS. 12A-12G depict plots describing operational parameters of a DC electrical machine 14 when operating in the generator mode between t0 and t5. Specifically, FIG. 12A includes a first winding voltage curve 132 that indicates voltage across the winding component 44 of the first commutation cell 36A. Additionally, FIG. 12B includes a negative switching curve 134 that indicates a negative switching signal supplied to a negative switching device 47 (e.g., in the first switching unit 42A) and a positive switching curve 136 that indicates a positive switching signal supplied to a positive switching device 47 (e.g., in the second switching unit 42B) of the first commutation cell 36A. Furthermore, FIG. 12C includes a first current curve 138 that indicates current flowing in the first portion (e.g., the first half 60A or the first coil 62A) and a second current curve 140 that indicates current flowing in a second portion (e.g., the second half 60A or the second coil 62B) of the winding component 44. Additionally, FIG. 12D includes a first commutation cell voltage curve 142 that indicates voltage across the first commutation cell 36A.

Figure 12A:
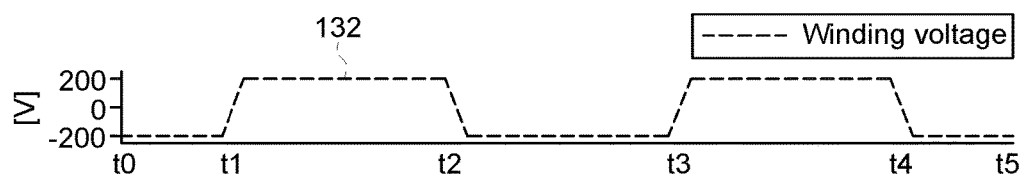
FIG. 12A is a plot of voltage across the winding component of the first commutation cell when operating in the generator mode, in accordance with an embodiment.
Figure 12B:
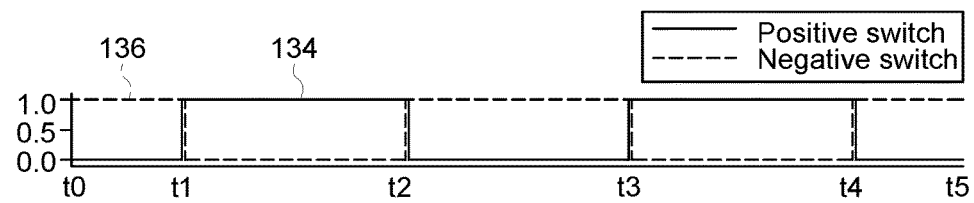
FIG. 12B is a plot of control signals used to control operation of the switching units in the first commutation cell when operating in the generator mode, in accordance with an embodiment.
Figure 12C:
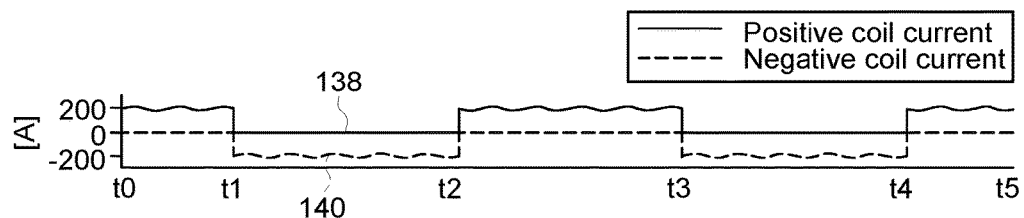
FIG. 12C is a plot of current flowing in the winding component of the first commutation cell when operating in the generator mode, in accordance with an embodiment.

As depicted in FIG. 12A, the voltage across the winding component 44 in the first commutation cell 36A is negative at t0, transitions from negative to positive at t1, transitions from positive to negative at t2, transitions from negative to positive at t3, transitions from positive to negative at t4, and remains negative until t5. As described above, when the winding voltage is negative (e.g., less than the generator voltage threshold), the positive switching device 47 may be closed and the negative switching device 47 may be open. Accordingly, as depicted in FIG. 12B, the positive switching signal is high, thereby closing the positive switching device 47, and the negative switching signal is low, thereby opening the negative switching device 47, between t0 to approximately t1, approximately t2 to approximately t3, and approximately t4 to t5. Thus, as depicted in FIG. 12C, current flows through the first portion (e.g., the first half 60A or the first coil 62A) of the winding component 44 between t0 to approximately t1, approximately t2 to approximately t3, and approximately t4 to t5.

On the other hand, when the voltage across the winding component 44 is positive (e.g., not less than the motor voltage threshold), the negative switching device 47 may be closed and the positive switching device 47 may be open. Accordingly, as depicted in FIG. 12B, the negative switching signal is high, thereby closing the negative switching device 47, and the positive switching signal is low, thereby opening the positive switching device 47, between approximately t1 to approximately t2 and approximately t3 to approximately t4. Thus, as depicted in FIG. 12C, current flows through the second portion (e.g., the second half 60B or the second coil 62B) of the winding component 44 between approximately t1 to approximately t2 and approximately t3 to approximately t4.

Figure 12D:
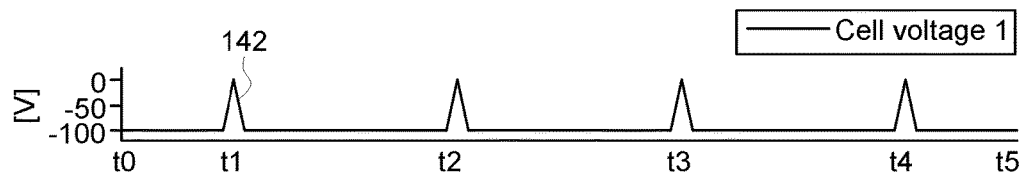
FIG. 12D is a plot of voltage across each of the multiple commutation cells in the DC electrical machine when operating in the generator mode, in accordance with an embodiment.

By operating in this manner, as depicted in FIG. 12D, the voltage across the first commutation cell 36A fluctuates, but remains negative, thereby indicating that DC electrical power is being output from the first commutation cell 36A. As such, by controlling operation of the switching units 42 (e.g., by instructing the switching devices 47 to open or close) based at least in part on the winding voltage, the controller 18 facilitates operating the DC electrical machine 14 in the generator mode.

Figure 12E:
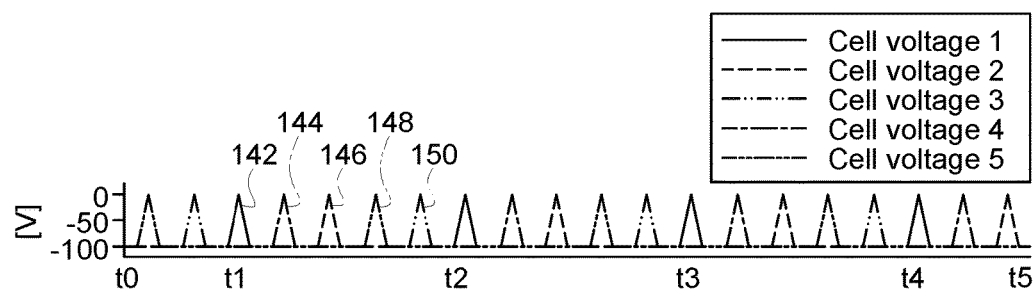
FIG. 12E is a plot of voltage across each of the multiple commutation cells when operating in the generator mode, in accordance with an embodiment.

Additionally, FIG. 12E includes the first commutation cell voltage curve 142 that indicates voltage across the first commutation cell 36A, a second commutation cell voltage curve 144 that indicates voltage across the second commutation cell 36B, a third commutation cell voltage curve 146 that indicates voltage across the third commutation cell 36C, a fourth commutation cell voltage curve 148 that indicates voltage across the fourth commutation cell 36D, and a fifth commutation cell voltage curve 150 that indicates voltage across a fifth commutation cell 36E. Furthermore, FIG. 12F includes a machine voltage curve 152 that indicates voltage between the first terminal 31 and the second terminal 32 of the DC electrical machine 14. Furthermore, FIG. 12G includes a machine current curve 154 that indicates current flowing from the first terminal 31 to the second terminal 32 of the DC electrical machine 14.

As depicted in FIG. 12E, with respect to the voltage profile of the first commutation cell 36A, the voltage profile of the second commutation cell 36B is shifted one-fifth of the duration between t1 and t2, the voltage profile of the third commutation cell 36C is shifted two-fifths of the duration between t1 and t2, the voltage profile of the fourth commutation cell 36D is shifted three-fifths of the duration between t1 and t2, and the voltage profile of the fifth commutation cell 36E is shifted four-fifths of the duration between t1 and t2. Accordingly, in some embodiments, the controller 18 may determine the voltage profile of the other commutation cells 36 by explicitly measuring voltage profile of the first commutation cell 36A and time shifting. Additionally or alternative, the controller 18 may explicitly measure the voltage profile of each of the commutation cells 36, for example, using voltage sensors 25.

As described above, by measuring winding voltage in a commutation cell 36, the controller 18 may explicitly determine a switching sequence for the commutation cell 36. For example, when winding voltage in the first commutation cell 36A is measured, the controller 18 may explicitly determine a switching sequence for operating the first commutation cell 36A. As described above, in some embodiments, winding voltage of less than all of the commutation cells 37 may be measured. In such embodiments, the controller 18 may determine switching sequences for the other commutation cells 36 by time shifting the explicit switching sequence. For example, the controller 18 may determine a switching sequence for the second commutation cell 36B by time shifting the switching sequence for the first commutation cell 36A one-fifth of the duration between t1 and t2, the third commutation cell 36C by time shifting the switching sequence for the first commutation cell 36A two-fifths of the duration between t1 and t2, the fourth commutation cell 36D by time shifting the switching sequence for the first commutation cell 36A three-fifths of the duration between t1 and t2, and the fifth commutation cell 36E by time shifting the switching sequence for the first commutation cell 36A four-fifths of the duration between t1 and t2.

Figure 12F:
FIG. 12F is a plot of voltage across the terminals of the DC electrical machine when operating in the generator mode, in accordance with an embodiment.
Figure 12G:
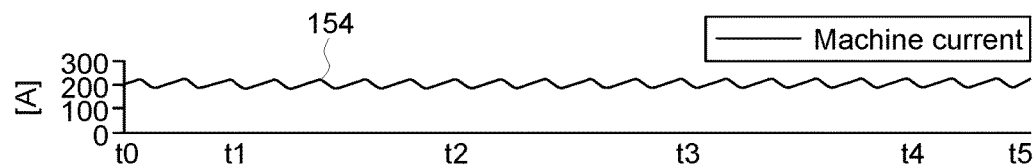
FIG. 12G is a plot of current flowing through the terminals of the DC electrical machine when operating in the generator mode, in accordance with an embodiment.

By operating in this manner, as depicted in FIG. 12F, the voltage between the first terminal 31 and the second terminal 32 of the DC electrical machine 14 is maintained negative. Additionally, as depicted in FIG. 12G, the current flowing through from the first terminal 31 to the second terminal 32 of the DC electrical machine 14 is maintained positive. As such, DC electrical power is supplied (e.g., output) from the DC electrical machine 14, thereby operating the DC electrical machine 14 in the generator mode.

Thus, using the switching unit 42 described in FIG. 5, the DC electrical machine 14 may operate in both the motor mode and the generator mode. Specifically, supplying DC electrical power to the DC electrical machine 14 may enable the DC electrical machine 14 to actuate the rotor 34 in a first direction. Additionally, using mechanical energy to actuate the rotor 34 in a second (e.g., opposite) direction enables the DC electrical machine 14 to generate output DC electrical power. In other words, the switching unit 42 may enable the DC electrical machine 14 to provide two quadrant operating capabilities. To provide additional quadrant operating capabilities, other configuration of switching units 42 may be utilized.

Figure 14:
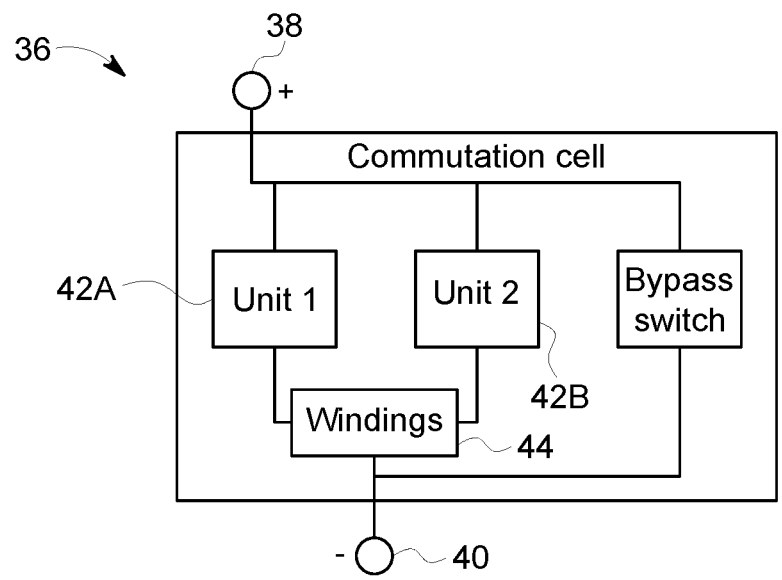
FIG. 14 is a block diagram of another embodiment of commutation cell that may be used in the electrical machine of FIG. 3, in accordance with an embodiment.

For example, one embodiment of a switching unit 42 that may enable four quadrant operating capabilities is described in FIG. 14. In the depicted embodiment, the switching unit 42 includes a first switching device 156 and a second switching device 158 coupled in anti-parallel between the first terminal 46 and the second terminal 48. Thus, when the first switching device 156 is closed and the second switching device is open, the switching unit 42 may conduct current from the first terminal 46 to the second terminal 48 (e.g., in a first direction). On the other hand, when the first switching device 156 is open and the second switching device 158 is closed, the switching unit 42 may conduct current from the second terminal 48 to the first terminal 46. Additionally, when both the first switching device 156 and the second switching device 158 are open, the switching unit may disconnect the first terminal 46 and the second terminal 48, thereby blocking voltage and current.

Accordingly, by maintaining the second switching device 158 open, the first switching device 156 may be operated similar to the switching device 47 described above to enable the DC electrical machine 14 to provide two quadrant operating capabilities. For example, this may enable the DC electrical machine 14 to, in the motor mode, actuate the rotor 34 in the first direction and, in the generator mode, generate DC electrical power when the rotor is actuated in the second (e.g., opposite) direction.

Figure 13:
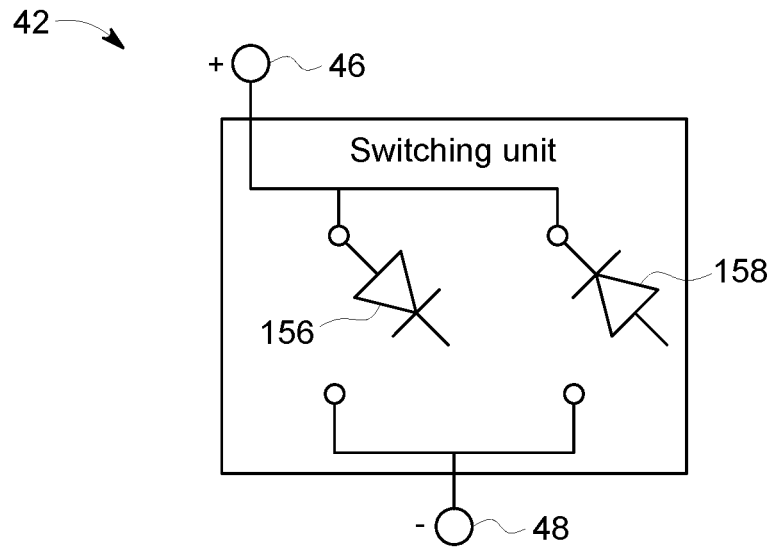
FIG. 13 is a block diagram of another embodiment of a switching unit that may be utilized in the commutation cell of FIG. 4, in accordance with an embodiment.

In a similar manner, by maintaining the first switching device 156 open, the second switching device 158 may be operated to enable the DC electrical machine 14 to provide two quadrant operating capabilities. However, since the second switching device 158 enables current to flow in an opposite direction from the first switching device 156, the two quadrant operating capabilities provided by operating the second switching device 158 may be opposite the two quadrant operating capabilities provide by operating the first switching device 156. For example, this may enable the DC electrical machine to, in the motor mode, actuate the rotor 34 in the second direction and, in the generator mode, generate DC electrical power when the rotor is actuate in the first (e.g., opposite) direction. As such, utilizing the switching unit 42 described in FIG. 13 may enable the DC electrical machine 14 to provide four quadrant operating capabilities.

As described above, the commutation cells 36 are connected in series between the first terminal 31 and the second terminal 32 of the DC electrical machine 14. Since connected in series, current flow may be blocked if any of the commutation cells 36 disconnects its first terminal 38 and second terminal 40, for example, when a fault occurs in the first switching unit 42A or the second switching unit 42B. In some instances, faults may affect less than all of the commutation cells 36. In such instances, instead of completely disabling the DC electrical machine 14, it may be possible to continue operation by bypassing the faulty commutation cells 36, for example, using a bypass switching device.

To help illustrate, one embodiment of a commutation cell 36 with a bypass switching device 160 is described in FIG. 14. As depicted, the bypass switching device 160 is electrically connected between the first terminal 38 and the second terminal 40 of the commutation cell 36. Thus, when the bypass switching device 160 is open, the commutation cell 36 may operate normally by using the first switching unit 42A and the second switching unit 42B. On the other hand, when the bypass switching device 160 is closed, current may flow through the bypass switching device 160, thereby bypassing the first switching unit 42A, the second switching unit 42B, and the winding component 44. Accordingly, in some embodiments, the controller 18 may instruct the bypass switching device 160 to remain open normally and close when a fault is detected in the commutation cell 36. In this manner, DC electrical machine 14 may continue operation even when a fault is present in one or more of the commutation cells 36.

Technical effects of the invention include providing techniques to improve operational efficiency and/or design flexibility of a DC electrical machine—particularly when the DC electrical machine operates using high voltage electrical power (e.g., HVDC) and/or actuates a mechanical connection (e.g., a drive shaft) at high speeds. To facilitate, in some embodiments, the DC electrical machine may utilize multiple commutation cells connected in series. Additionally, each commutation cell may reduce or even eliminate use of energy storage capacitors, which may otherwise limit operational efficiency and/or design flexibility—particularly in high power applications. Instead, each commutation cell may include a winding component (e.g., a center-tapped winding) divided between a first portion and a second portion by a center node wound such that polarity of voltage induced in the first portion and the second portion is opposite in polarity. In this manner, operation of the commutation cells may be controlled based at least in part on voltage induced in the winding to periodically reverse magnetic field generated by the winding components, thereby facilitating operating the DC electrical machine in a motor mode, and/or to rectify electrical power output from the winding components, thereby facilitating operating the DC electrical machine in a generator mode.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A direct current electrical machine configured to operate in a motor mode, a generator mode, or both, comprising:
   a rotor configured to generate a rotor magnetic field;
   a first commutation cell comprising:
      a first winding component comprising:
         a first portion electrically coupled between a first terminal and a second terminal of the first winding component; and
         a second portion electrically coupled between a third terminal and the second terminal of the first winding component;
      a first switching device electrically coupled to the first terminal of the first winding component and configured to be closed when a first voltage induced across the first portion of the first winding component by rotation of the rotor magnetic field is positive; and
      a second switching device electrically coupled to the third terminal of the first winding component and configured to be closed when a second voltage induced across the second portion of the first winding component by the rotation of the rotor magnetic field is negative, wherein polarity of the first voltage and the second voltage are opposite; and
   a controller configured to control the operation of the direct current electrical machine.

2. The direct current electrical machine of claim 1, wherein:
   the first communication cell does not comprise an energy store capacitor or a resonance capacitor; and
   the first portion of the first winding component and the second portion of the first winding component are electromagnetically coupled.

3. The direct current electrical machine of claim 1, comprising a second commutation cell electrically coupled in series with the first commutation cell, wherein the second commutation cell comprises:
   a second winding component
      a third portion electrically coupled between a fourth terminal and a fifth terminal of the second winding component;
      a fourth portion electrically coupled between a sixth terminal and the fifth terminal of the second winding component;
   a third switching electrically coupled to the fourth terminal of the second winding component and configured to be closed when a third voltage induced across the third portion of the second winding component by the rotation of the rotor magnetic field is positive; and
   a fourth switching device electrically coupled to the sixth terminal of the second winding component and configured to be closed when a fourth voltage induced across the fourth portion by rotation of the rotor magnetic field is negative, wherein polarity of the third voltage and the fourth voltage are opposite.

4. The direct current electrical machine of claim 3, wherein:
the direct current electrical machine comprises a seventh terminal configured to electrically connect the direct current electrical machine to a direct current power source or a direct current electrical load;
the first commutation cell comprises:
an eighth terminal electrically coupled to the seventh terminal of the direct current electrical machine, the first switching device, and the second switching device; and
a ninth terminal electrically coupled to the second terminal of the first winding component; and
the second commutation cell comprises:
a tenth terminal electrically coupled to the ninth terminal of the first communication cell, the third switching device, and the fourth switching device; and
an eleventh terminal electrically coupled to the fifth terminal of the second winding component.

5. The direct current electrical machine of claim 1, wherein:
the first winding component comprises a center-tapped coil, the first portion comprises a first half of the center-tapped coil, and the second portion comprises a second half of the center-tapped coil; or
the first portion comprises a first coil and the second portion comprises a second coil.

6. The direct current electrical machine of claim 1, wherein the first commutation cell comprises:
a third switching device coupled in anti-parallel with the first switching device, wherein the first switching device is configured to conduct current only in a first direction when closed and the third switching device is configured to conduct current only in a second direction opposite the first direction when closed; and
a fourth switching device coupled in anti-parallel with the second switching device, wherein the second switching device is configured to conduct current only in the first direction when closed and the fourth switching device is configured to conduct current only in the second direction when closed.

7. The direct current electrical machine of claim 1, comprising:
a sensor coupled across the first winding component to measure a third voltage comprising the first voltage and the second voltage; and
wherein the controller is communicatively coupled to the second winding component and is configured to:
transmit a first switching signal to the first switching device, wherein the first switching signal is configured to instruct the first switching device when to open and when to close based at least in part on the third voltage; and
transmit a second switching signal to the second switching device, wherein the second switching signal is configured to instruct the second switching device when to open and when to close based at least in part on third voltage.

8. The direct current electrical machine of claim 1, wherein:
when the direct current electrical machine is operating in the motor mode to convert input direct current electrical power into output mechanical energy:
the first switching device is configured to be closed when the first voltage is positive; and
the second switching device is configured to be closed when the second voltage is negative; and
when the direct current electrical machine is operating in the generator mode to convert input mechanical energy into output direct current electrical power:
the first switching device is configured to be closed when the first voltage is negative; and
the second switching device is configured to be closed when the second voltage is positive.

9. The direct current electrical machine of claim 1, wherein:
the first switching device comprises a first unidirectional current carrying bidirectional voltage blocking switching device configured to conduct current in only one direction when closed; and
the second switching device comprises a second unidirectional current carrying bidirectional voltage blocking switching device configured to conduct current in only the one direction when closed.

10. The direct current electrical machine of claim 1, wherein the first switching device and the second switching device each comprises a thyristor, a reverse blocking insulated-gate bipolar transistor (RB-IGBT), a RB integrated gate-commutated thyristor (RB-IGCT), an insulated-gate bipolar transistor (IGBT), an integrated gate-commutated thyristor (IGCT), a metal-oxide field effect transistor (MOSFET), a diode, or any combination thereof.

11. The direct current electrical machine of claim 1, wherein the first commutation cell comprises a bypass switching device electrical coupled between a fourth terminal and a fifth terminal of the first communication cell, wherein the bypass switching device is configured to be:
closed when a fault is detected in the first commutation cell to bypass the first switching device, the second switching device, and the first winding component to enable current to flow between the first commutation cell and a second commutation cell connected in series with the first commutation cell; and
opened otherwise to enable the first commutation cell to control flow of the current using the first switching device and the second switching device.

12. A method of operating a direct current electrical machine, comprising:
receiving, using a controller communicatively coupled to the direct current electrical machine, first sensor data from first a sensor indicating a first voltage induced in a first center-tapped coil in a first commutation cell of the direct current electrical machine by rotation of a rotor;
comparing, using the controller, the first voltage with a first voltage threshold;
instructing, using the controller, a first switching unit in the first commutation cell to conduct current through a first half of the first center-tapped coil when the first voltage is greater than the first voltage threshold;
instructing, using the controller, a second switching unit in the first commutation cell to conduct current through a second half of the first center-tapped coil when the first voltage is not greater than the first voltage threshold, wherein the second switching unit and the second half of the first center-tapped coil are coupled in parallel with the first switching unit and the first half;
instructing, using the controller, a third switching unit in a second commutation cell coupled in series with the first commutation cell to conduct current through a third half of a second center-tapped coil in the second commutation cell after instructing the first switching unit to conduct current through the first half; and instructing, using the controller, a fourth switching unit in the second commutation cell to conduct current through a fourth half of the second center-tapped coil after instructing the second switching unit to conduct current through the second half.

13. The method of claim 12, wherein:

instructing the first switching unit to conduct current through the first half of the first center-tapped coil comprises instructing the first commutation cell to produce a first magnetic field in the first half of the first center-tapped coil without using an energy storage capacitor or a resonance capacitor;

instructing the first switching unit to conduct current through the second half of the first center-tapped coil comprises instructing the first communication cell to produce a second magnetic field in the second half of the first center-tapped coil without using the energy storage capacitor or the resonance capacitor; and the first half of the first center-tapped coil and the second half of the first center-tapped coil are electromechanically coupled.

14. The method of claim 12, wherein:

instructing the first switching unit to conduct current through the first half of the first center-tapped coil comprises:

instructing a first switching device in the first switching unit to close when the first voltage transitions from less than to greater than a second voltage threshold, wherein the second voltage threshold comprises a negative voltage less than the first voltage threshold; and instructing the first switching device to open when the first voltage transitions from greater than to less than the second voltage threshold; and instructing the first switching unit to conduct current through the second half of the first center-tapped coil comprises:

instructing a second switching device in the second switching unit to close when the first voltage transitions from greater than to less than a third voltage threshold, wherein the third voltage threshold comprises a positive voltage greater than the first voltage threshold; and instructing the second switching device to open when the first voltage transitions from less than to greater than the third voltage threshold.

15. The method of claim 12, comprising:

determining, using the controller, a second voltage induced in a second center-tapped coil in the second commutation cell by rotation of the rotor, wherein a first profile of the first voltage is a duration ahead of a second profile of the second voltage, wherein instructing the third switching unit to conduct current through the third half comprises instructing the third switching unit to conduct current through the third half the duration after instructing the first switching unit to conduct current through the first half; and instructing the fourth switching unit to conduct current through the fourth half comprises instructing the fourth switching unit to conduct current through the fourth half the duration after instructing the second switching unit to conduct current through the second half.

16. The method of claim 12, wherein:

instructing the first switching unit to conduct current through the first half comprises transmitting a first switching signal to a first unidirectional current carrying bidirectional voltage blocking switching device in the first switching unit, wherein the first switching signal is configured to open, close, or both the first unidirectional current carrying bidirectional voltage blocking switching device; and instructing the second switching device to conduct current through the second half comprises transmitting a second switching signal to a second unidirectional current carrying bidirectional voltage blocking switching device in the second switching unit, wherein the second switching signal is configured to open, close, or both the second unidirectional current carrying bidirectional voltage blocking switching device.

17. A tangible, non-transitory, computer-readable medium configured to store instructions executable by one or more processors in a machine system, wherein the instructions comprise instructions to:

determine, using the one or more processors, a first voltage induced in a first coil in a first commutation cell of an electrical machine by rotation of a rotor in the electrical machine, wherein the first commutation cell does not comprise an energy storage capacitor or a resonance capacitor;

instruct, using the one or more processors, a first switching device in the first commutation cell to open to block current from flowing through the first coil and to close to enable current to flow only in one direction through the first coil to a second commutation cell electrically connected to the first commutation cell in series based at least in part on the first voltage; and instruct, using the one or more processors, a second switching device in the first commutation cell to open to block current from flowing through a second coil in the first commutation cell and to close to enable current to flow only in the one direction through the second coil to the second commutation cell based at least in part on the first voltage, wherein the first coil and the second coil are electromechanically coupled.

18. The computer-readable medium of claim 17, comprising instructions to determine, using the one or more processors, a second voltage induced in the second coil by the rotation of the rotor, wherein the second voltage and the first voltage are opposite polarities;

wherein the instructions to instruct the second switching device to open and to close comprise instructions to instruct the second switching device to open and to close based at least in part on the second voltage.

19. The computer-readable medium of claim 17, wherein:

the instructions to instruct the first switching device to open and to close comprise instructions to:

instruct the first switching device to close before the first voltage transitions from negative to positive;

instruct the first switching device to remain closed while the first voltage is positive; and instruct the first switching device to open after the first voltage transitions from positive to negative; and the instructions to instruct the second switching device to open and to close comprise instruction to:

instruct the second switching device to close before the first voltage transitions from positive to negative;

instruct the second switching device to remain closed while the first voltage is negative; and instruct the second switching device to open after the second voltage transitions from negative to positive.

20. The computer-readable medium of claim 17, comprising instructions to:

instruct, using the one or more processors, a third switching device in the second commutation cell to open to block current flowing from through a third coil in the second commutation cell and to close to enable current to flow only in the one direction through the third coil based at least in part on the first voltage; and instruct, using the one or more processors, a fourth switching device in the second commutation cell to open to block current from flowing through a fourth coil in the second commutation cell and to close to enable current to flow only in the one direction through the fourth coil based at least in part on the first voltage.

* * * * *